(12) United States Patent
Destarac et al.

(10) Patent No.: US 10,160,821 B2
(45) Date of Patent: Dec. 25, 2018

(54) CONTROLLED RADICAL POLYMERIZATION IN WATER-IN-WATER DISPERSION

(71) Applicant: RHODIA OPERATIONS, Paris (FR)

(72) Inventors: Mathias Destarac, Toulouse (FR); David James Wilson, Coye la Foret (FR); Silvia Stoilova, Paris (FR)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 14/383,201

(22) PCT Filed: Mar. 11, 2013

(86) PCT No.: PCT/EP2013/054905
§ 371 (c)(1),
(2) Date: Sep. 5, 2014

(87) PCT Pub. No.: WO2013/132108
PCT Pub. Date: Sep. 12, 2013

(65) Prior Publication Data
US 2015/0057411 A1    Feb. 26, 2015

(30) Foreign Application Priority Data
Mar. 9, 2012    (FR) .................... 12 00725

(51) Int. Cl.
| | |
|---|---|
| *C08F 2/10* | (2006.01) |
| *C08F 220/56* | (2006.01) |
| *C08F 2/38* | (2006.01) |
| *C08F 293/00* | (2006.01) |
| *C09D 153/00* | (2006.01) |
| *C09J 153/00* | (2006.01) |

(52) U.S. Cl.
CPC ............. *C08F 220/56* (2013.01); *C08F 2/10* (2013.01); *C08F 2/38* (2013.01); *C08F 293/005* (2013.01); *C09D 153/00* (2013.01); *C09J 153/00* (2013.01); *C08F 2400/02* (2013.01); *C08F 2438/03* (2013.01)

(58) Field of Classification Search
CPC ............ C08F 220/56; C08F 2400/02; C08F 2438/03; C08F 293/005; C08F 2/10; C08F 2/38; C09D 153/00; C09J 153/00
See application file for complete search history.

(56) References Cited

U.S. PATENT DOCUMENTS

| | | | |
|---|---|---|---|
| 3,493,500 | A | 2/1970 | Volk et al. |
| 3,658,772 | A | 4/1972 | Volk et al. |
| 6,153,705 | A | 11/2000 | Corpart et al. |
| 6,506,836 | B1 | 1/2003 | Bremser et al. |
| 6,716,905 | B1 | 4/2004 | Bremser et al. |
| 6,777,513 | B1 | 8/2004 | Destarac et al. |
| 2004/0059078 | A1 | 3/2004 | Destarac et al. |
| 2005/0054794 | A1 | 3/2005 | Destarac et al. |
| 2007/0073011 | A1* | 3/2007 | Favier ........... C08F 2/00 526/73 |
| 2009/0107681 | A1* | 4/2009 | Hough ........... C09K 8/584 166/308.3 |
| 2010/0093929 | A1* | 4/2010 | Destarac ........... C08F 2/38 524/831 |
| 2011/0092634 | A1* | 4/2011 | Gonzalez ........... C08F 2/001 524/543 |
| 2011/0092635 | A1* | 4/2011 | Venkatesh ........... C08F 2/22 524/547 |
| 2011/0256085 | A1* | 10/2011 | Talingting Pabalan ........... A61K 8/042 424/70.13 |
| 2013/0046052 | A1* | 2/2013 | Armes ........... C08F 2/18 524/547 |
| 2013/0267661 | A1* | 10/2013 | Destarac ........... C08F 2/38 525/294 |
| 2015/0011657 | A1* | 1/2015 | Destarac ........... C08F 26/06 514/772.5 |
| 2015/0011693 | A1* | 1/2015 | Destarac ........... C08F 293/005 524/505 |
| 2015/0057411 | A1* | 2/2015 | Destarac ........... C08F 2/10 524/831 |

FOREIGN PATENT DOCUMENTS

| | | |
|---|---|---|
| FR | 2879606 A1 | 6/2006 |
| FR | 2917415 A1 | 12/2008 |
| JP | 50-127991 A | 10/1975 |

(Continued)

OTHER PUBLICATIONS

Ikegami et al. Journal of Polymer Science vol. 56, pp. 133-152 (1962).*

Wayland, Bradford B., et al—"Living Radical Polymerization of Acrylates by Organocobalt Porphyrin Complexes", 1994, vol. 116, pp. 7943-7944; 2 pgs.

Matyjaszewski, Krzysztof, et al—"Controlled Radical Polymerizations: The Use of Alkyl Iodides in Degenerative Transfer", 1995, Macromolecules, vol. 28, pp. 2093-2095; 3 pgs.

(Continued)

*Primary Examiner* — Michael A Salvitti

(57) ABSTRACT

The present invention relates to a method for preparing an aqueous dispersion of water-soluble polymers, which comprises a step (E) of radical polymerization, wherein the following are brought into contact in an aqueous medium (M) in which the synthesized polymer is not soluble:

at least one ethylenically unsaturated monomer which is soluble in the aqueous medium (M);

at least one source of free radicals; and a reactive stabilizer which comprises:

a polymer chain (CP) which is soluble in the medium (M), a group (G) providing the radical polymerization of step (E) with a living and controlled nature, such as, for example, a group carrying a thiocarbonylthio —S(C=S)— group.

14 Claims, No Drawings

(56) References Cited

FOREIGN PATENT DOCUMENTS

| | | |
|---|---|---|
| JP | S 52-52006 A | 4/1977 |
| WO | WO 96/30421 A1 | 10/1996 |
| WO | WO 98/58974 A1 | 12/1998 |
| WO | WO 99/03894 A1 | 1/1999 |
| WO | WO 99/31144 A1 | 6/1999 |
| WO | WO 00/37507 A1 | 6/2000 |
| WO | WO 00/39169 A1 | 7/2000 |
| WO | WO 00/75207 A1 | 12/2000 |
| WO | WO 01/42312 A1 | 6/2001 |
| WO | WO 02/10223 A2 | 2/2002 |
| WO | WO 02/26836 A2 | 4/2002 |
| WO | WO 2008/000766 A2 | 1/2008 |
| WO | WO 2009/153162 A1 | 12/2009 |
| WO | WO 2011/110841 A2 | 9/2011 |

OTHER PUBLICATIONS

Otsu, Takayuki, et al—"Role of Initiator-Transfer Agent-Terminator (Iniferter) in Radical Polymerizations: Polymer Design by Organic Disulfides as Iniferters", 1982, Makromolecules Chem., Rapid Commun. vol. 3, pp. 127-132; 6 pgs.

Braun, D.—"Initiation of free radical polymerization by thermal cleavage of carbon-carbon bonds", 1996, vol. 111, Issue No. 1, pp. 63-71; 9 pgs.

Murray, Patrick G., et al—"Water Soluble Polymers Produced by Homogeneous Dispersion Polymerization", 2000, ACS Symposium Series, vol. 755, Chapter 4, American Chemical Society, pp. 36-45; 10 pgs.

* cited by examiner

CONTROLLED RADICAL POLYMERIZATION IN WATER-IN-WATER DISPERSION

CROSS-REFERENCE TO RELATED APPLICATIONS

The present application is a U.S. national stage entry under 35 U.S.C. § 371 of International Application No. PCT/EP2013/054905 filed Mar. 11, 2013, which claims priority to FR Application No. 1200725 filed on Mar. 9, 2012, the whole content of this application being herein incorporated by reference for all purposes.

The present invention relates to a method for preparing water-soluble polymers, giving access to these polymers in the form of concentrated aqueous dispersions. The present invention gives access to aqueous dispersions of this type which have a high solids content, but which are nevertheless fluid and stable and therefore can easily be transported, handled and stored. The invention also relates to applications of the dispersions thus produced, which can in particular be easily diluted in an aqueous medium so as to release the polymers in solution, for example so as to modify the rheological properties of an aqueous medium.

When reference is made, in the present description, to an "aqueous" medium, it is a medium comprising water, optionally as a mixture with other water-soluble solvents (for instance ethanol or other alcohols, for example, or else glycerol), and in which salts or else other water-soluble compounds can be dissolved. For the purposes of the present description, in an "aqueous" medium, the water is preferably a compound present in an amount of at least 30% by weight, more preferentially of at least 50% by weight. When water-soluble solvents other than water are used, it is preferable for the ratio of the weight of water present in the aqueous medium relative to the total weight of the water and of the other water-soluble solvents present in the medium (water/solvents weight ratio) to be greater than 50%, or even than 60%.

For the purposes of the present description, "an aqueous dispersion of a polymer" denotes a composition comprising a polymer in the form of microscopically observable particles having dimensions of between 100 nm and 20 microns (most commonly between 500 nm and 15 microns, and typically between 1 and 10 microns) dispersed within a phase consisting of an aqueous medium as defined above. A dispersion of polymers, within the meaning given to the term as used in the present description, should be distinguished from a solution of polymers, which does not contain polymers in the form of microscopically observable particles. For the purposes of the present description, it is considered that a polymer is solubilized in a medium in particular if the medium contains no aggregate of this polymer in the form of aggregates exceeding 100 nm. An aqueous dispersion of a water-soluble polymer is generally quite easily distinguished, visually, from a polymer solution: typically, the dispersion has a milky appearance and widely scatters light, whereas a solution usually has a transparent appearance.

For the purposes of the present description, the term "water-soluble polymer" denotes a polymer which can be dissolved in water, at least under certain pH and salinity conditions, at a concentration of more than 0.1 g/l, or even more than 0.5 g/l, without the appearance of aggregates/particles having dimensions greater than 100 nm, and typically without any appearance of aggregates or particles. Such polymers are well known to those skilled in the art and, by way of water-soluble polymers of this type, mention may in particular be made, by way of illustration, of the homo- and copolymers obtained by polymerization of a monomer of acrylamido, N-vinylpyrrolidone (NVP) and/or acrylic acid type.

It is well known that the synthesis of water-soluble polymers is difficult to carry out directly in an aqueous medium; the polymerization of water-soluble monomers in fact causes an increase in the viscosity of the polymerization medium, and, in order to avoid an effect of solidification of the medium (or at the very least to allow the recovery of the polymer obtained), it is necessary to limit the molecular weight and/or the concentration of the polymer synthesized. Solution polymerization makes it possible to achieve weights exceeding 1 000 000 to 2 000 000 g/mol only with low dry extracts (1% to 15% at most).

Alternative solutions, such as gel polymerization, have admittedly been described, said alternative solutions resulting in polymers which are in more concentrated form, but which are difficult to efficiently be dispersed in aqueous media. In addition, gel polymerization systematically results in high-molecular-weight polymers (typically greater than 5 000 000 g/mol).

To obtain high-molecular-weight water-soluble polymers (greater than 500 000 g/mol), it is well-known practice to carry out an inverse emulsion polymerization, namely by carrying out the polymerization in droplets dispersed in a hydrophobic continuous medium. Polymerizations of this type (termed "inverse emulsion polymerizations") admittedly result in polymers of relatively high molecular weight, in particular in the range of from 500 000 to 10 000 000 g/mol, but, in order to subsequently use them in an aqueous medium, it is necessary to separate them from the hydrophobic phase, which results in additional costs. Moreover, the polymers obtained comprise surfactants used for their synthesis which can be detrimental to certain subsequent applications, unless they are extracted, which involves additional costs.

Variants have in the past been proposed in order to try to overcome these difficulties, and to attempt to obtain dispersions of water-soluble polymers directly in an aqueous medium, for example by synthesizing polymers with an ionic nature in an aqueous medium comprising salts, the polymer precipitating when it reaches a sufficiently high molecular weight. In this type of process, sometimes denoted "homogeneous dispersion polymerization", schematically, the polymerization begins as in a solution polymerization of usual type, but finishes as in polymerization in a dispersed medium. By way of example of processes of this type, mention may, for example, be made of the methods proposed in U.S. Pat. No. 3,658,772, U.S. Pat. No. 3,493,500 or in FR 2 879 606 or else in *American Chemical Society Symposium Series, vol* 755, *Chapter* 4, 36-45. The aqueous dispersions of water-soluble polymers which are obtained by homogeneous dispersion polymerization are admittedly advantageous (in particular by virtue of their relatively low cost and by virtue of the access to dispersions directly usable in an aqueous medium), but they are limited to specific polymers and they also have two major drawbacks, namely:

a high viscosity:
although similar, in spirit, to an inverse phase polymerization, homogeneous dispersion polymerization results in polymers of which a part remains in solution and which therefore causes an increase in the viscosity of the medium, in a manner similar to solution polymerization. Thus, even though it is produced, the problem encountered in solution polymerization is still present, which imposes similar limitations in terms of polymer size and of concentration;

a relative stability:

the polymer particles have a tendency to coalesce, during the polymerization and subsequently, which can cause solidification phenomena during the polymerization and/or sedimentation phenomena during transportation or storage of the dispersions, thereby, once again, involving limitations in terms of polymer size and/or of concentration.

Given these drawbacks, the polymer content in the dispersions obtained rarely exceeds 20% by weight.

In addition, this type of polymerization (homogeneous dispersion polymerization) exhibits poor control regarding the structure of the polymer chains formed, typically poor control of the molecular weight of the chains formed, which can result in a very high polydispersity.

An objective of the present invention is to provide a method for obtaining water-soluble polymers in the form of a dispersion in an aqueous medium, which dispenses with the abovementioned difficulties.

To this effect, it is proposed, according to the present invention, to carry out a polymerization of the abovementioned homogeneous dispersion polymerization type, but using, in addition, a reactive stabilizer which provides increased stabilization compared with that obtained with the abovementioned processes, allowing in particular higher solids contents.

More specifically, a subject of the present invention is a process for preparing an aqueous dispersion of water-soluble polymers, which comprises a step (E) of radical polymerization, wherein the following are brought into contact in an aqueous medium (M) in which the synthesized polymer is not soluble:

at least one ethylenically unsaturated monomer which is soluble in the aqueous medium (M);

at least one source of free radicals; and a reactive stabilizer which comprises:

a polymer chain (PC) which is soluble in the medium (M), a group (G) providing the radical polymerization of step (E) with a living and controlled nature, such as, for example, a group carrying a thiocarbonylthio —S(C=S)— group.

The reactive stabilizer which is used in step (E) is a particular compound, which is used in the polymerization process (E), according to a mechanism that is well known per se, termed "living" controlled radical polymerization, for example described in patent applications WO 98/58974, WO 00/75207 and WO 01/42312. Schematically, according to this mechanism, the polymerization of step (E) results in the formation of a polymer chain by gradual insertion of the monomer units between the polymer chain initially present on the reactive compound and the group providing the living nature. The polymerization is termed "living" insofar as the polymer being formed remains continually available for the incorporation of new monomer units between the polymer chain being formed and the group providing the living and controlled nature. Moreover, the polymerization is termed "controlled" since the size of the growing chains can be finely regulated, typically according to the ratio of the number of monomers to the number of groups providing a living and controlled nature that are available in the medium (the higher this ratio, the higher the molecular weight obtained). It should be noted in this respect that, compared with the methods described in the past, the method of the present invention makes it possible to obtain a very fine control of the structure of the polymer chains formed, with in particular a very precise control of the molecular weight of the chains formed and a very low polydispersity index, which constitutes another specific advantage of the present invention. This control makes it possible in particular to scan through a very wide size range for the polymers synthesized, with molecular weights which can range from 500 000 to 20 000 000 g/mol, for example between 1 000 000 and 15 000 000 g/mol and in particular between 2 000 000 and 10 000 000 g/mol. More generally, the molecular weights for the polymers synthesized can typically range from 5000 to a few million g/mol, for example from 10 000 to 10 000 000 g/mol, in particular from 20 000 to 5 000 000 g/mol.

The reactive stabilizer used in step (E) has, moreover, a polymer chain (PC) which is soluble in the aqueous medium (M) of step (E). The reactive stabilizer is typically a living polymer or oligomer, resulting from a step ($E^0$) prior to step (E), wherein the following are brought into contact:

at least one ethylenically unsaturated monomer which is soluble in the aqueous medium (M);

at least one source of free radicals; and an agent for controlling the radical polymerization, for example an agent carrying a thiocarbonylthio —S(C=S)— group and typically an agent carrying the same group (G) as the one desired on the reactive stabilizer of step (E).

The polymer chain which is present on the reactive stabilizer is specifically soluble in the medium (M). Given the specific conditions for carrying out step (E), this polymer chain remains continuously covalently bonded to the end of the growing polymer chains in step (E). The soluble polymer chain (PC) present from the beginning on the reactive stabilizer of step (E) is generally distinct in nature from the polymer chain which is formed during step (E).

Although the polymer chain which forms in step (E) becomes gradually insoluble in the medium (M) following the incorporation of monomer units, the polymer chain (PC) remains, for its part, continuously soluble in the medium (M). As a result, during the conducting of step (E), living polymer chains which are soluble in the medium (M) first form, followed by precipitation of the chains in the form of particles which have the stabilizing polymer chains (PC) at the periphery, and then the continuation of the polymerization within the particles thus formed, according to a mechanism similar to that of dispersion polymerization. The very fine control of the radical polymerization performed according to the invention allows, in this context, a better control of these steps, and in particular a better management of the nucleation step than that which is obtained for example in the homogeneous dispersion polymerization processes of the type described at the beginning of the present description.

As indicated above in the present description, the polymers synthesized at the end of step (E) are insoluble in the medium (M) where they are dispersed. Nevertheless, these polymers based on water-soluble units are, intrinsically, water-soluble polymers for the purposes of the present description, which can therefore be redissolved in an aqueous medium, for example by simple dilution in an aqueous medium.

Although it is not absolutely required, step (E) of the process of the invention can, according to one particular embodiment, can be brought together with additional non-reactive stabilizing agents, for example amphiphilic polymers which are block polymers or which more generally comprise a block which is not compatible with the medium (M) and a block which is compatible with the medium (M), advantageously obtained according to a controlled radical polymerization process, or else nonreactive stabilizing homo- and copolymers. For the purposes of the present description, the term "nonreactive stabilizer" is intended to mean a stabilizing agent which does not comprise a group (G). According to another embodiment of the invention, no nonreactive additional stabilizing agent is used during step (E).

According to another aspect, a subject of the present invention is the dispersions of the type obtained according to the abovementioned process, typically directly at the end of step (E). In addition to the advantages described above with regard to the control of the polymer chains formed, these dispersions have the advantage of being stable and of low viscosity, and therefore of being easy to handle and to transport, with solids contents which can be high. The present invention makes it possible in particular to obtain polymer dispersions where the polymer concentration can be greater than 10%, in particular greater than or equal to 15%, preferably greater than 20%, or even greater than 30%, or even greater than 35% or even than 40% in certain cases, which is not obtained with the current processes, to the inventors' knowledge. Typically, the polymer concentration nevertheless remains less than 60% by weight, or even than 50% by weight. Particularly advantageous dispersions that can be prepared according to the invention have, for example, polymer contents between 30% and 50% by weight, for example between 35% and 45% by weight.

The aqueous dispersions of polymer which are obtained in the context of the present invention also have the advantage that they can be used as they are as an additive for aqueous compositions without a subsequent purification or phase-inversion step (contrary, for example, to the dispersions resulting from inverse emulsion polymerization). The addition of a small amount of a dispersion according to the invention to an aqueous composition results, as a general rule, in a dissolution effect which induces rapid and direct solubilization of the polymer in said composition. This effect can advantageously be used to increase the viscosity of an aqueous composition or more generally to modify the rheological properties of this aqueous composition. In this context, the polymer present in the dispersions of the invention performs the role of rheology-modifying agent only in the final composition, when it is in the solubilized state. It is interesting to note that it does not provide this effect in the dispersions of the present invention, where it is, on the contrary, present in the dispersed state. The dispersions of the invention constitute, in this respect, a very advantageous alternative to the aqueous solutions of polymer obtained by solution polymerization which are extremely viscose and difficult to handle.

The aqueous dispersions of the present invention can also act as a surface-modifying agent.

Various advantageous features and embodiments of the invention will now be described in greater detail.

The Reactive Stabilizer

The nature of the group (G) present on the reactive stabilizer and providing the polymerization step (E) with a living and controlled nature (group also hereinafter designated "control group") can vary to quite a large extent. According to one particular embodiment, the reactive stabilizer used in step (E) can carry several groups of this type, but it usually carries only one group (G).

The control group (G), which is suitable for inducing a controlled radical polymerization reaction of monomers, can for example be:

a xanthate group as described, for example, in WO 98/58974,
a dithiocarbamate group as described in WO 99/31144,
a dithiocarbazate group as described in WO 02/26836,
a dithiophosphoroester group as described in WO 02/10223.

Preferably, it is a xanthate, dithiocarbamate or dithiocarbazate group, more preferentially a xanthate group.

More generally, step (E) can be carried out using one of the following processes:

the process of application WO 99/03894 which carries out a polymerization in the presence of nitroxide precursors,
the process of application WO 96/30421 which uses an atom transfer radical polymerization (ATRP),
the process of controlled radical polymerization using control agents of iniferter type according to the teaching of Otu et al., Makromol. Chem. Rapid. Commun., 3, 127 (1982),
the process of controlled radical polymerization by degenerative transfer of iodine according to the teaching of Tatemoto et al., Jap. 50, 127, 991 (1975), Daikin Kogyo Co ltd Japan and Matyjaszewski et al., Macromolecules, 28, 2093 (1995),
the process of controlled radical polymerization using tetraphenylethane derivatives, disclosed by D. Braun et al. in Macromol. Symp. 111, 63 (1996), or else
the process of controlled radical polymerization using organocobalt complexes, described by Wayland et al. in J. Am. Chem. Soc. 116, 7973 (1994),
the process of controlled radical polymerization using diphenylethylene (WO 00/39169 or WO 00/37507).

More generally, the group (G) can be selected from all the groups suitable for carrying out a controlled polymerization of the monomers used in step (E), for example of ATRP (atom transfer radical polymerization), NMP (nitroxide-mediated polymerization), RAFT or MADIX type.

The control group comprising a thiocarbonylthio —S(C=S)— group, and particularly xanthates, dithioesters, trithiocarbonates, dithiocarbamates and dithiocarbazates, proved to be particularly advantageous as group (G) in the reactive stabilizers used in step (E).

According to one particularly advantageous embodiment, this group is introduced via the control agent used in the controlled radical polymerization performed in the abovementioned step (E⁰), which is typically a RAFT or MADIX control agent.

The group (G) present on the reactive stabilizer typically corresponds to the formula —S(C=S)—Z where Z is as defined below, this group being typically obtained by using, in step (E⁰), a control agent which corresponds to formula (A) below:

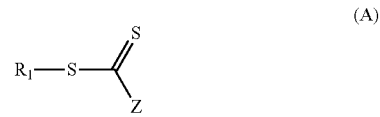

(A)

in which:
Z represents:
a hydrogen atom,
a chlorine atom,
an optionally substituted alkyl or optionally substituted aryl radical,
an optionally substituted heterocycle, an optionally substituted alkylthio radical,
an optionally substituted arylthio radical,
an optionally substituted alkoxy radical,
an optionally substituted aryloxy radical,
an optionally substituted amino radical,
an optionally substituted hydrazine radical,
an optionally substituted alkoxycarbonyl radical,
an optionally substituted aryloxycarbonyl radical,
an optionally substituted carboxyl, acyloxy radical,
an optionally substituted aroyloxy radical,
an optionally substituted carbamoyl radical,
a cyano radical,
a dialkyl- or diaryl-phosphonato radical,
a dialkyl-phosphinato or diaryl-phosphinato radical, or
a polymer chain,
and
$R_1$ represents:
an optionally substituted alkyl, acyl, aryl, aralkyl, alkene or alkyne group,
a saturated or unsaturated, aromatic, optionally substituted carbocycle or heterocycle, or
a polymer chain.

The groups R1 or Z, when they are substituted, may be substituted with optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—O2CR), carbamoyl (—CONR2), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR2), halogen, perfluoroalkyl $C_nF_{2n+1}$, allyl, epoxy, alkoxy (—OR), S-alkyl, S-aryl, groups of hydrophilic or ionic nature such as alkali metal salts of carboxylic acids, alkali metal salts of sulfonic acid, polyalkylene oxide chains (PEO, PPO), cationic substituents (quaternary ammonium salts), R representing an alkyl or aryl group, or a polymer chain.

According to one particular embodiment, $R_1$ is a substituted or unsubstituted, preferably substituted, alkyl group.

The optionally substituted alkyl, acyl, aryl, aralkyl or alkyne groups to which reference is made in the present description generally contain 1 to 20 carbon atoms, preferably 1 to 12 and more preferentially 1 to 9 carbon atoms. They may be linear or branched. They may also be substituted with oxygen atoms, in particular in the form of esters or sulfur or nitrogen atoms.

Among the alkyl radicals, mention may be made especially of methyl, ethyl, propyl, butyl, pentyl, isopropyl, tert-butyl, pentyl, hexyl, octyl, decyl or dodecyl radicals.

For the purposes of the present description, the alkyne groups are radicals generally containing from 2 to 10 carbon atoms, and contain at least one acetylenic unsaturation, such as the acetylenyl radical.

For the purposes of the present description, the acyl groups are radicals generally containing from 1 to 20 carbon atoms with a carbonyl group.

Among the aryl radicals which may be used according to the invention, mention may be made in particular of the phenyl radical, optionally substituted especially with a nitro or hydroxyl function.

Among the aralkyl radicals, mention may be made in particular of the benzyl or phenethyl radical, optionally substituted especially with a nitro or hydroxyl function.

When $R_1$ or Z is a polymer chain, this polymer chain may be derived from a radical or ionic polymerization or derived from a polycondensation.

In the context of the present invention, it is especially advantageous to use, as control agents, xanthates, dithiocarbamates or dithiocarbazates.

Advantageously, use is made, as control agent in step ($E^0$), of xanthate compounds, for instance O-ethyl-S-(1-methoxycarbonyl ethyl)xanthate of formula ($CH_3CH(CO_2CH_3)$)$S(C=S)OCH_2CH_3$, and, more generally, the reactive stabilizer of step (E) preferably carries such groups.

A control agent that is particularly suited to the implementation of step ($E^0$) is the compound sold by the company Rhodia under the name Rhodixan A1.

The polymer chain (PC) which is present on the reactive stabilizer may also vary to quite a large extent and it can be adjusted, case-by-case, according to the medium (M) used and to the type of composition into which it is desired to introduce the polymer of the dispersion.

Typically, the polymer chain (PC) present on the reactive stabilizer can, for example, be selected from the homo- and copolymers (random, gradient or block) resulting from the homopolymerization or from the copolymerization of monomers of which at least one part is selected from:
ethylenically unsaturated monocarboxylic and dicarboxylic acids, such as acrylic acid, methacrylic acid, itaconic acid, maleic acid or fumaric acid,
unsaturated carboxylic acid amides, such as acrylamide, methacrylamide, N-methylolacrylamide or -methacrylamide, N-alkylacrylamides,
vinylamine amides, in particular vinylformamide, vinylacetamide, N-vinylpyrrolidone and N-vinylcaprolactam,
or more generally from:
ethylenically unsaturated monocarboxylic and dicarboxylic acids, such as acrylic acid, methacrylic acid, itaconic acid, maleic acid or fumaric acid,
unsaturated carboxylic acid amides, such as acrylamide, methacrylamide, N-methylolacrylamide or -methacrylamide, N-alkylacrylamides, N,N-dimethylaminomethylacrylamide or -methacrylamide, 2-(N,N-dimethylamino)ethylacrylamide or -methacrylamide, 3-(N,N-dimethylamino)propylacrylamide or -methacrylamide, or 4-(N,N-dimethylamino)butylacrylamide or -methacrylamide,
vinylamine amides, in particular vinylformamide, vinylacetamide, N-vinylpyrrolidone and N-vinylcaprolactam,
α,β monoethylenically unsaturated amino esters, such as 2-(dimethylamino)ethyl acrylate (ADAM), 2-(dimethylamino)ethyl methacrylate (DMAM or MADAM), 3-(dimethylamino)propyl methacrylate, 2-(tert-butylamino)ethyl methacrylate, 2-(dipentylamino)ethyl methacrylate, or 2-(diethylamino)ethyl methacrylate,
vinylpyridines,
vinylamine,
vinylimidazolines,
monomers which are precursors of amine functions, such as N-vinylformamide or N-vinylacetamide, which generate primary amine functions by simple acid or basic hydrolysis,
ammoniumacryloyl or acryloyloxy monomers,
trimethylammoniumpropylmethacrylate salts, in particular the chloride,
trimethylammoniumethylacrylamide or -methacrylamide chloride or bromide, trimethylammoniumbutylacrylamide or -methacrylamide methylsulfate,
trimethylammoniumpropylmethacrylamide methylsulfate (MAPTA MeS),
(3-methacrylamidopropyl)trimethylammonium chloride (MAPTAC),
(3-acrylamidopropyl)trimethylammonium chloride or methylsulfate (APTAC or APTA MeS),
methacryloyloxyethyltrimethylammonium chloride or methylsulfate,
acryloyloxyethyltrimethylammonium (ADAMQUAT) salts, such as acryloyloxyethyltrimethylammonium chloride or acryloyloxyethyltrimethylammonium methylsulfate (ADAMQUAT Cl or ADAMQUAT MeS),
methyldiethylammoniumethyl acrylate methylsulfate (ADAEQUAT MeS),
benzyldimethylammoniumethyle acrylate chloride or methylsulfate (ADAMQUAT BZ 80),
1-ethyl 2-vinylpyridinium bromide, chloride or methylsulfate or 1-ethyl 4-vinylpyridinium bromide, chloride or methylsulfate,
N,N-dialkyldiallylamine monomers, such as N,N-dimethyldiallylammonium chloride (DADMAC),
dimethylaminopropylmethacrylamide, N-(3-chloro-2-hydroxypropyl)trimethylammonium chloride (DIQUAT chloride),
dimethylaminopropylmethacrylamide, N-(3-methylsulfate-2-hydroxypropyl)-trimethylammonium methylsulfate (DIQUAT methylsulfate),
the monomer of formula

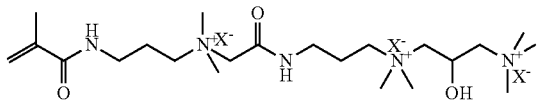

where $X^-$ is an anion, preferably chloride or methylsulfate,
monomers carrying at least one vinyl phosphonate function, such as vinylphosphonic acid, vinylphosphonic acid dimethyl ester, vinylphosphonic acid bis(2-chloroethyl) ester, vinylidenediphosphonic acid, vinylidenediphosphonic acid tetraisopropyl ester or alpha-styrenephosphonic acid, or mixtures thereof.

Alternatively, the monomers may comprise monomers selected from:
ethylenically unsaturated carboxylic acids, sulfonic acids and phosphonic acids, and/or derivatives thereof such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, monoethylenically unsaturated dicarboxylic acid monoesters comprising 1 to 3 and preferably 1 to 2 carbon atoms, for example monomethyl maleate, vinylsulfonic acid, (meth)allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid, vinylphosphonic acid, α-methylvinylphosphonic acid and allylphosphonic acid;
esters of α,β-ethylenically unsaturated monocarboxylic and dicarboxylic acids with C2-C3 alkanediols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate and polyalkylene glycol(meth)acrylates;
α,β-ethylenically unsaturated monocarboxylic acid amides and the N-alkyl and N,N-dialkyl derivatives thereof, such as acrylamide, methacrylamide, N-methyl(meth)acrylamide, N-ethyl(meth)acrylamide, N-propyl(meth)acrylamide, N,N-dimethyl(meth)acrylamide, N,N-diethyl(meth)acrylamide, morpholinyl(meth)acrylamide, and metholylacrylamide (acrylamide and N,N-dimethyl(meth)acrylamide prove to be in particular advantageous);
N-vinyllactams and derivatives thereof, for example N-vinylpyrrolidone and N-vinylpiperidone;
open-chain N-vinylamide compounds, for example N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide;
esters of α,β-ethylenically unsaturated monocarboxylic and dicarboxylic acids with aminoalcohols, for example N,N-dimethylaminomethyl(meth)acrylate, N,N-dimethylaminoethyl(meth)acrylate, N,N-diethylaminoethyl acrylate, and N,N-dimethylaminopropyl (meth)acrylate;
amides of α,β-ethylenically unsaturated monocarboxylic and dicarboxylic acids with diamines comprising at least one primary or secondary amino group, such as N-[2-(dimethylamino)ethyl]acrylamide, N[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide and N-[4-(dimethylamino)butyl]methacrylamide;
N-diallylamines, N,N-diallyl-N-alkylamines, acid-addition salts thereof and quaternization products thereof, the alkyl used here preferentially being $C_1$-$C_3$-alkyl;
N,N-diallyl-N-methylamine and N,N-diallyl-N,N-dimethylammonium compounds, for example the chlorides and bromides;
nitrogenous heterocycles substituted with vinyl and allyl, for example N-vinylimidazole, N-vinyl-2-methylimidazole, heteroaromatic compounds substituted with vinyl and allyl, for example 2- and 4-vinylpyridine, 2- and 4-allylpyridine, and salts thereof;
sulfobetaines; and
mixtures and combinations of two or more of the above-mentioned monomers.

The polymer chain (PC) present on the reactive stabilizer can also comprise some units which are hydrophobic in nature, provided that the chain (PC) remains, overall, soluble in the medium (M).

Whatever its nature, the reactive stabilizer used in step (E) can typically be used at a weight concentration ranging from 0.05% to 10%, for example between 0.1% and 5%, in the medium (M). The lower the reactive stabilizer/monomer ratio, the larger the size of the polymer chains synthesized in step (E). For low contents of reactive stabilizer, for example below 1%, it may prove to be advantageous to use nonreactive additional stabilizers of the type described above in the present description.

The Water-Soluble Monomers

The water-soluble monomers used in step (E) can be selected from all the monomers which are soluble per se in the aqueous medium (M), but which form polymers which are insoluble in this medium.

The polymers formed in step (E) are insoluble in the medium (M), in the sense that they are in the dispersed state in the medium (M) at the end of the reaction. As indicated above in the present description, these polymers are nevertheless intrinsically water-soluble.

For the purposes of the invention, the term "polymer insoluble in the medium (M)" is intended to mean a polymer which is able to form particles during its formation in step (E). Preferably, it is not a polymer which exhibits this property only in a given temperature range. In this respect, the monomers used in step (E) are preferably distinct from NIPAM monomers.

The water-soluble monomers used in step (E) may, for example, be monomers which are soluble in the medium (M) and which are selected from:
- ethylenically unsaturated monocarboxylic and dicarboxylic acids, such as acrylic acid, methacrylic acid, itaconic acid, maleic acid or fumaric acid,
- unsaturated carboxylic acid amides, such as acrylamide, methacrylamide, N-methylolacrylamide or -methacrylamide, N-alkylacrylamides, N,N-dimethylaminomethylacrylamide or -methacrylamide, 2-(N,N-dimethylamino)ethylacrylamide or -methacrylamide, 3-(N,N-dimethylamino)propylacrylamide or -methacrylamide, or 4-(N,N-dimethylamino)butylacrylamide or -methacrylamide,
- vinylamine amides, in particular vinylformamide, vinylacetamide, N-vinylpyrrolidone and N-vinylcaprolactam,
- α,β monoethylenically unsaturated amino esters, such as 2-(dimethylamino)ethyl acrylate (ADAM), 2-(dimethylamino)ethyl methacrylate (DMAM or MADAM), 3-(dimethylamino)propyl methacrylate, 2-(tert-butylamino)ethyl methacrylate, 2-(dipentylamino)ethyl methacrylate, or 2-(diethylamino)ethyl methacrylate,
- vinylpyridines,
- vinylamine,
- vinylimidazolines,
- monomers which are precursors of amine functions, such as N-vinylformamide or N-vinylacetamide, which generate primary amine functions by simple acid or basic hydrolysis,
- ammoniumacryloyl or acryloyloxy monomers,
- trimethylammoniumpropylmethacrylate salts, in particular the chloride,
- trimethylammoniumethylacrylamide or -methacrylamide chloride or bromide,
- trimethylammoniumbutylacrylamide or -methacrylamide methylsulfate,
- trimethylammoniumpropylmethacrylamide methylsulfate (MAPTA MeS),
- (3-methacrylamidopropyl)trimethylammonium chloride (MAPTAC),
- (3-acrylamidopropyl)trimethylammonium chloride or methylsulfate (APTAC or APTA MeS),
- methacryloyloxyethyltrimethylammonium chloride or methylsulfate,
- acryloyloxyethyltrimethylammonium (ADAMQUAT) salts, such as acryloyloxyethyltrimethylammonium chloride or acryloyloxyethyltrimethylammonium methylsulfate (ADAMQUAT Cl or ADAMQUAT MeS),
- methyldiethylammoniumethyl acrylate methylsulfate (ADAEQUAT MeS),
- benzyldimethylammoniumethyle acrylate chloride or methylsulfate (ADAMQUAT BZ 80),
- 1-ethyl 2-vinylpyridinium bromide, chloride or methylsulfate or 1-ethyl 4-vinylpyridinium bromide, chloride or methylsulfate, N,N-dialkyldiallylamine monomers, such as N,N-dimethyldiallylammonium chloride (DADMAC),
- dimethylaminopropylmethacrylamide, N-(3-chloro-2-hydroxypropyl)trimethylammonium chloride (DIQUAT chloride),
- dimethylaminopropylmethacrylamide, N-(3-methylsulfate-2-hydroxypropyl)-trimethylammonium methylsulfate (DIQUAT methylsulfate),
- the monomer of formula

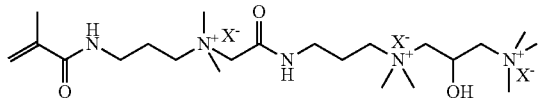

where X⁻ is an anion, preferably chloride or methylsulfate,
- monomers carrying at least one vinyl phosphonate function, such as vinylphosphonic acid, vinylphosphonic acid dimethyl ester, vinylphosphonic acid bis(2-chloroethyl)ester, vinylidenediphosphonic acid, vinylidenediphosphonic acid tetraisopropyl ester or alpha-styrenephosphonic acid, or mixtures thereof, mixtures of two or more of these monomers.

Alternatively, the monomers may comprise monomers selected from:
- ethylenically unsaturated carboxylic acids, sulfonic acids and phosphonic acids, and/or derivatives thereof such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, monoethylenically unsaturated dicarboxylic acid monoesters comprising 1 to 3 and preferably 1 to 2 carbon atoms, for example monomethyl maleate, vinylsulfonic acid, (meth)allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid, vinylphosphonic acid, α-methylvinylphosphonic acid and allylphosphonic acid;
- esters of α,β-ethylenically unsaturated monocarboxylic and dicarboxylic acids with C2-C3 alkanediols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate and polyalkylene glycol(meth)acrylates;
- α,β-ethylenically unsaturated monocarboxylic acid amides and the N-alkyl and N,N-dialkyl derivatives thereof, such as acrylamide, methacrylamide, N-methyl(meth)acrylamide, N-ethyl(meth)acrylamide, N-propyl(meth)acrylamide, N,N-dimethyl(meth)acrylamide, N,N-diethyl(meth)acrylamide, morpholinyl(meth)

acrylamide, and metholylacrylamide (acrylamide and N,N-dimethyl(meth)acrylamide prove to be in particular advantageous);

N-vinyllactams and derivatives thereof, for example N-vinylpyrrolidone and N-vinylpiperidone;

open-chain N-vinylamide compounds, for example N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide;

esters of α,β-ethylenically unsaturated monocarboxylic and dicarboxylic acids with aminoalcohols, for example N,N-dimethylaminomethyl(meth)acrylate, N,N-dimethylaminoethyl(meth)acrylate, N,N-diethylaminoethyl acrylate, and N,N-dimethylaminopropyl (meth)acrylate;

amides of α,β-ethylenically unsaturated monocarboxylic and dicarboxylic acids with diamines comprising at least one primary or secondary amino group, such as N-[2-(dimethylamino)ethyl]acrylamide, N[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide and N-[4-(dimethylamino)butyl]methacrylamide;

N-diallylamines, N,N-diallyl-N-alkylamines, acid-addition salts thereof and quaternization products thereof, the alkyl used here preferentially being $C_1$-$C_3$-alkyl;

N,N-diallyl-N-methylamine and N,N-diallyl-N,N-dimethylammonium compounds, for example the chlorides and bromides;

nitrogenous heterocycles substituted with vinyl and allyl, for example N-vinylimidazole, N-vinyl-2-methylimidazole, heteroaromatic compounds substituted with vinyl and allyl, for example 2- and 4-vinylpyridine, 2- and 4-allylpyridine, and salts thereof;

sulfobetaines; and mixtures and combinations of two or more of the abovementioned monomers.

The following monomers are in particular advantageous:

ethylenically unsaturated monocarboxylic and dicarboxylic acids, such as acrylic acid, methacrylic acid, itaconic acid, maleic acid or fumaric acid, unsaturated carboxylic acid amides, such as acrylamide, methacrylamide, N-methylolacrylamide or -methacrylamide, N-alkylacrylamides, vinylamine amides, in particular vinylformamide, vinylacetamide, N-vinylpyrrolidone and N-vinylcaprolactam.

The polymer chain synthesized in step (E) may be a homopolymer or else a random or gradient copolymer. According to one particular embodiment, it may be a block polymer chain: for this, step (E) can be carried out in several steps, by first performing a first polymerization step with a first type of monomer, and then at least a second polymerization step while introducing other polymers into the medium, after exhaustion of the monomers of the first step.

The polymer chain synthesized in step (E) can more generally just as easily be cationic, anionic or zwitterionic, as nonionic.

According to one advantageous embodiment, water-soluble crosslinking monomers can be added to the aqueous medium with the water-soluble monomers or after the introduction of the water-soluble monomers. Advantageously, they make it possible to use nonreactive stabilizers in the process of the present invention.

Preferably, these monomers have two or three ethylenic unsaturations.

Thus, mention may in particular be made of acrylic, methacrylic, acrylamido, methacrylamido, vinyl ester, vinyl ether, diene, styrene, alpha-methylstyrene, and allyl derivatives. These monomers may thus contain functional groups other than ethylenic unsaturations, for example hydroxyl, carboxyl, ester, amide, amino or substituted amino, mercapto, silane, epoxy or halo functions.

The monomers belonging to these families are divinylbenzene and divinylbenzene derivatives, vinyl methacrylate, methacrylic acid anhydride, allyl methacrylate, ethylene glycol dimethylacrylate, phenylene dimethylacrylate, diethylene glycol dimethylacrylate, triethylene glycol dimethylacrylate, tetraethylene glycol dimethylacrylate, polyethylene glycol 200 dimethylacrylate, polyethylene glycol 400 dimethylacrylate, 1,3-butanediol dimethylacrylate, 1,4-butanediol dimethylacrylate, 1,6-hexanediol dimethylacrylate, 1,12-dodecanediol dimethylacrylate, 1,3-glyceryl dimethylacrylate, diurethane dimethylacrylate, and trimethylolpropane trimethylacrylate. For the family of multifunctional acrylates, mention may particularly be made of vinyl acrylate, bisphenol A epoxy diacrylate, dipropylene glycol diacrylate, tripropylene glycol diacrylate, polyethylene glycol 600 diacrylate, ethylene glycol diacrylate, diethylene glycol diacrylate, triethylene glycol diacrylate, tetraethylene glycol diacrylate, ethoxylated neopentyl glycol diacrylate, butanediol diacrylate, hexanediol diacrylate, aliphatic urethane diacrylate, trimethylolpropane triacrylate, ethoxylated trimethylolpropane triacrylate, propoxylated trimethylolpropane triacrylate, propoxylated glyceryl triacrylate, aliphatic urethane triacrylate, trimethylolpropane tetraacrylate, and dipentaerythritol pentaacrylate. With regard to the vinyl ethers, mention may particularly be made of vinyl crotonate, diethylene glycol divinyl ether, 1,4-butanediol divinyl ether, and triethylene glycol divinyl ether. For the allyl derivatives, mention may particularly be made of diallyl phthalate, diallyldimethylammonium chloride, diallyl maleate, sodium diallyloxyacetate, diallylphenylphosphine, diallyl pyrocarbonate, diallyl succinate, N,N'-diallyltartardiamide, N,N-diallyl-2,2,2-trifluoroacetamide, the allyl ester of dialyloxyacetic acid, 1,3-diallylurea, triallylamine, triallyl trimesate, triallyl cyanurate, Manyl trimellitate, triallyl-1,3,5-triazine-2,4,6(1H, 3H, 5H)-trione. For the acrylamido derivatives, mention may be made of N,N'-methylenebisacrylamide, N,N'-methylenebismethacrylamide, glyoxal bisacrylamide, and diacrylamidoacetic acid. With regard to the styrene derivatives, mention may particularly be made of divinylbenzene and 1,3-diisopropenylbenzene.

In the case of the diene monomers, mention may particularly be made of butadiene, chloroprene and isoprene.

As multi-ethylenically unsaturated monomers, preference is given to N,N'-methylenebisacrylamide, divinylbenzene, ethylene glycol diacrylate, or trimethylolpropane triacrylate. These multi-ethylenically unsaturated monomers may be used alone or as mixtures.

Typically, the water-soluble monomers initially present in the chain (PC) of the reactive stabilizer are more soluble in the medium (M) than the ethylenically unsaturated monomers used in step (E), often being barely sensitive to the presence of solvents and/or of salts of the medium (M), as appropriate.

More generally, it is advantageous for the chain (PC) to be as soluble as possible in the medium (M). For this to be the case, the constituent monomers of the chain (PC) are preferably selected from monomers of which the solubility is among the highest.

According to one possible embodiment, the reactive stabilizers and the ethylenically unsaturated monomers are introduced together into the medium (M), and the mixing thereof is typically carried out before or during the addition of the initiator.

According to another possible embodiment, ethylenically unsaturated monomers can be gradually added to the medium (M) after the addition of the reactive stabilizers, typically during or after the addition of the initiator.

The Sources of Free Radicals

Any source of free radicals which is known per se as being suitable for polymerization processes in an aqueous medium may be used both in step (E) of the process of the invention and in the previous step ($E^0$).

The radical polymerization initiator may, for example, be selected from the following initiators:

hydrogen peroxides such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate, ammonium persulfate, azo compounds such as: 2-2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-méthyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethyleneisobutyramidine)dichloride, 2,2'-azobis(2-amidinopropane)dichloride, 2,2'-azobis(N,N'-diméthyleneisobutyramide), 2,2'-azobis (2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide] or 2,2'-azobis(isobutyramide)dihydrate, redox systems comprising combinations such as:

mixtures of hydrogen peroxide, alkyl peroxide, peresters, percarbonates and the like and any iron salts, titanous salts, zinc formaldehyde sulfoxylate or sodium formaldehyde sulfoxylate, and reducing sugars, alkali metal or ammonium persulfates, perborate or perchlorate in combination with an alkali metal bisulfite, such as sodium metabisulfite, and reducing sugars, and alkali metal persulfates in combination with an arylphosphinic acid, such as benzenephosphonic acid and the like, and reducing sugars.

According to one advantageous embodiment, use may be made of a radical initiator of redox type, which has the advantage of not requiring heating of the reaction medium (no thermal initiation).

Thus, the source of free radicals that is used can typically be selected from the redox initiators conventionally used in radical polymerization, typically not requiring heating for thermal initiation thereof. It is typically a mixture of at least one water-soluble oxidizing agent with at least one water-soluble reducing agent.

The oxidizing agent present in the redox system may be selected, for example, from peroxides such as: hydrogen peroxide, tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, sodium persulfate, potassium persulfate, ammonium persulfate or potassium bromate.

The reducing agent present in the redox system may typically be selected from sodium formaldehyde sulfoxylate (in particular in dihydrate form, known under the name Rongalit, or in the form of an anhydrite), ascorbic acid, erythorbic acid, sulfites, bisulfites or metasulfites (in particular alkali metal sulfites, bisulfites or metasulfites), nitrilotrispropionamides, and tertiary amines and ethanolamines (which are preferably water-soluble).

Possible redox systems comprise combinations such as:

mixtures of water-soluble persulfates with water-soluble tertiary amines, mixtures of water-soluble bromates (for example alkali metal bromates) with water-soluble sulfites (for example alkali metal sulfites), mixtures of hydrogen peroxide, alkyl peroxide, peresters, percarbonates and the like and any iron salts, titanous salts, zinc formaldehyde sulfoxylate or sodium formaldehyde sulfoxylate, and reducing sugars, alkali metal or ammonium persulfates, perborate or perchlorate in combination with an alkali metal bisulfite, such as sodium metabisulfite, and reducing sugars, and alkali metal persulfates in combination with an arylphosphinic acid, such as benzenephosphonic acid and the like, and reducing sugars.

An advantageous redox system comprises (and preferably consists of) for example a combination of ammonium persulfate and sodium formaldehyde sulfoxylate.

Optionally, the aqueous medium (M) of step (E) may comprise at least one salt, selected for example from organic or inorganic salts which render the synthesized polymer insoluble or improve said rendering, and which generally aim to facilitate the obtaining of the dispersion of water-soluble polymers which is sought in the context of the invention.

Salts that are very suitable are those comprising sulfate, dihydrogenphosphate, phosphate and halide anions. The corresponding cations may be selected from sodium, potassium, calcium, magnesium, aluminum, zinc and ammonium cations, and mixtures thereof. The simultaneous use of two or more of these salts is also possible. For example, a mixture of sodium sulfate and ammonium sulfate may be used.

Optionally, the medium (M) of step (E) may also comprise at least one water-soluble solvent, for example a polyol, such as glycerol. According to one embodiment, the medium (M) comprises both salts and a solvent. For example, the medium (M) may comprise a mixture of sodium sulfate and ammonium sulfate, and a solvent, preferably a polyol.

Alternatively, the medium (M) may comprise only salts, with no solvent. For example, the medium (M) may comprise a mixture of sodium sulfate and ammonium sulfate, without solvent.

The Conditions for Carrying Out Steps ($E^0$) and (E)

Given the use of the redox system in step ($E^0$) and/or step (E), this step is advantageously performed in an aqueous medium, typically using water as sole solvent. It thus makes it possible to obtain a polymer directly in aqueous medium without the need to use organic solvents, which makes the process particularly suited to use at the industrial scale.

Moreover, steps ($E^0$) and (E) are advantageously carried out at low temperature, preferably below 40° C., more advantageously at a temperature of less than or equal to 30° C., especially between 5 and 25° C. These two steps can therefore be carried out, for example, at ambient temperature, which is another advantage of the process of the invention, in terms of energy costs.

The possibility of performing step (E°) at low temperature moreover makes it possible to envision carrying it out for the polymerization of N-vinylcaprolactam (NVCL) in an aqueous medium (in water or, advantageously, in a mixture of water and of a water-soluble solvent), which necessitates polymerization at a temperature below its cloud point, which is 32° C. In this context, the process of the invention may in particular be carried out for the synthesis of poly(N-vinylcaprolactam) or of polymers based both on amphiphilic or nonamphiphilic NVCL and NVP monomer units.

Applications

The dispersions obtained at the end of step (E) can be used in a very large number of applications, in particular for the preparation of an aqueous paint, coating or adhesive composition, of an aqueous composition for the preparation of construction materials, or else for the preparation of cosmetic or body care compositions, of phytosanitary formulations or formulations intended for the agricultural field, or else in fluids for oil extraction and/or production (including drilling, fracturing and enhanced oil recovery), or else for the treatment of water (domestic, municipal, industrial, waste aqueous effluents), the manufacturing of paper and/or cardboard, the treatment of ores and of minerals, for instance fillers and pigments (for example the recovery of alumina according to the Bayer process), or the conditioning of soils.

In particular in these compositions, the dispersion of the invention is generally introduced as an additive for modifying the rheological properties of the composition, in particular for increasing the viscosity. More generally, it can be used as a flocculant, a coagulant, a stabilizer, a thickener or a flotation agent. The dispersion of the invention can also be used as a surface agent, in particular as a surface-modifying additive.

According to one particular aspect, the present invention relates to the preparation of an aqueous composition (such as one of the abovementioned compositions) comprising a step wherein a polymer dispersion resulting from step (E) is added to an aqueous pre-composition.

More generally, the dispersions of the invention can be used alone or as mixtures of several of said dispersions, in most of the applications that can be envisioned for water-soluble polymers.

EXAMPLES

The synthesis is carried out in two steps:
1. Synthesis of a living poly(sodium 2-acrylamido-2-methylpropanesulfonate) prepolymer P1
2. Preparation of a homogeneous water-in-water dispersion of acrylamide/acrylic acid copolymers Step 1: Synthesis of a Living poly(sodium 2-acrylamido-2-methylpropanesulfonate) Prepolymer P1

320 g of sodium 2-acrylamido-2-methylpropanesulfonate (AMPS 2405 50%), 188 g of distilled water, 3.3 g of O-ethyl-S-(1-methoxycarbonylethyl)xanthate of formula $(CH_3CH(CO_2CH_3))S(C=S)OEt$, 146 g of ethanol and 1.12 g of ACP (4'4-azobis-4-cyanovaleric acid) initiator were placed, at ambient temperature (20° C.), in a 1-liter round-bottomed flask. The mixture was degassed by sparging with nitrogen for 30 minutes. The round-bottomed flask was then placed in a thermostated oil bath at 75° C., and the polymerization reaction was then allowed to take place with stirring for 4 hours at 75° C.

100% conversion was obtained (determined by $^1H$ NMR). The number-average molar mass of the prepolymer P1, determined by $^1H$ NMR, is 15 537 g/mol.

The solvent was evaporated off under vacuum using a rotary evaporator (15 mbar, 50° C.) and dried for 120 minutes at 50° C. Water was then added so as to have a solution of prepolymer at 25%. The dry extract measured after solvent exchange is 25% (115° C., 60 min)—SOLUTION A.

Step 2 Preparation of a Homogeneous Water-in-Water Dispersion of Acrylamide/Acrylic Acid Copolymers Example A Poly(Acrylamide/Acrylic Acid) 70/30 Mol %

Conditions:
Prepolymer 1/poly(acrylamide/acrylic acid)=30% by weight.
Poly(Acrylamide/Acrylic Acid) concentration=14.9% by weight.

24 g of solution A, 27.88 g of acrylamide (aqueous solution at 50% by weight), 6.06 g of acrylic acid, 3.48 g of sodium sulfate, 18.60 g of ammonium sulfate, 8 g of glycerol, 45.18 g of distilled water and 0.35 g of sodium hydroxide (aqueous solution at 50% by weight) were placed in a 250 ml round-bottomed flask, at ambient temperature (20° C.). The mixture was degassed by sparging with nitrogen with stirring for 30 minutes. After having added 0.045 g of VA044 (2,2'-azobis[2-(2-imidazolin-2-yl)propane]dihydrochloride), the round-bottomed flask was placed in a thermostated oil bath at 30° C., still with stirring. After reaction for 4 hours, a further 0.045 g of VA044 was added. The polymerization reaction was then left to proceed, still with stirring, at 38° C. for an additional 3 hours and 30 minutes.

At the end of the 8 hours and thirty minutes of reaction, a conversion of >99.9% was obtained for acrylic acid and for acrylamide (conversions determined by HPLC). An analysis by size exclusion chromatography in an aqueous buffer solution of 100 mM NaCl, 25 mM $NaH_2PO_4$ and 25 mM $Na_2HPO_4$, pH 7, with a Malls 3 angle detector gives the following weight-average molar mass ($M_w$) and polydispersity index values:
$M_w=>210\,000$ g/mol
PI=>1.4

Using an analyzing polarizing microscope, the particle size was estimated between 1 and 3 μm.

The product is stable after 8 months of storage at ambient temperature.

Example B Poly(Acrylamide/Acrylic Acid) 70/30 Mol %

Conditions:
Prepolymer 1/poly(acrylamide/acrylic acid)=30% by weight.
Poly(Acrylamide/Acrylic Acid) concentration=15.0% by weight.

24 g of solution A, 27.88 g of acrylamide (aqueous solution at 50% by weight), 6.06 g of acrylic acid, 3.48 g of sodium sulfate, 18.60 g of ammonium sulfate, 52.79 g of distilled water and 0.35 g of sodium hydroxide (aqueous solution at 50% by weight) were placed in a 250 ml round-bottomed flask, at ambient temperature (20° C.). The mixture was degassed by sparging with nitrogen with stirring for 30 minutes. After having added 0.045 g of VA044 (2,2'-azobis[2-(2-imidazolin-2-yl)propane]dihydrochloride), the round-bottomed flask was placed in a thermostated oil bath at 38° C., still with stirring. After reaction for 4 hours, a further 0.045 g of VA044 was added. The polymerization reaction was then left to proceed, still with stirring, at 38° C. for an additional 3 hours and 30 minutes.

At the end of the 8 hours and thirty minutes of reaction, a conversion of 99.8% was obtained for acrylic acid and of 100% was obtained for acrylamide (conversions determined by HPLC). An analysis by size exclusion chromatography in an aqueous buffer solution of 100 mM NaCl, 25 mM $NaH_2PO_4$ and 25 mM $Na_2HPO_4$, pH 7, with a Malls 3 angle detector gives the following weight-average molar mass ($M_w$) and polydispersity index values:

$M_w$=>156 000 g/mol
PI=>1.2

Using an analyzing polarizing microscope, the particle size was estimated between 1 and 3 μm.

The product is stable after 8 months of storage at ambient temperature.

Example C Poly(Acrylamide/Acrylic Acid) 70/30 mol %

Conditions:

Prepolymer 1/poly(acrylamide/acrylic acid)=23% by weight.

Poly(Acrylamide/Acrylic Acid) concentration=15.4% by weight.

18.4 g of solution A, 3.37 g of sodium sulfate, 18 g of ammonium sulfate and 0.35 g of sodium hydroxide (aqueous solution at 50% by weight) were placed in a 250 ml round-bottomed flask, at ambient temperature (20° C.). The mixture was degassed by sparging with nitrogen with stirring for 30 minutes. After having added 0.045 g of VA044 (2,2'-azobis[2-(2-imidazolin-2-yl)propane]dihydrochloride), the round-bottomed flask was placed in a thermostated oil bath at 38° C., still with stirring. The introduction of a solution containing 27.88 g of acrylamide (aqueous solution at 50% by weight) and 6.06 g of acrylic acid is jointly begun, at a flow rate of 0.113 ml/min. After reaction for 4 hours, a further 0.045 g of VA044 was added. The polymerization reaction was then left to proceed, still with stirring, at 38° C. for an additional 3 hours and 30 minutes.

At the end of the 8 hours and thirty minutes of reaction, a conversion of 99.7% was obtained for acrylic acid and of 100% was obtained for acrylamide (conversions determined by HPLC). An analysis by size exclusion chromatography in an aqueous buffer solution of 100 mM NaCl, 25 mM $NaH_2PO_4$ and 25 mM $Na_2HPO_4$, pH 7, with a Malls 3 angle detector gives the following weight-average molar mass ($M_w$) and polydispersity index values:

$M_w$=>380 000
PI=>1.9

The chromatograms of the copolymers clearly show the presence of the two species: the acrylamide/acrylic acid copolymer and prepolymer P1.

Example D Poly(Acrylamide/Acrylic Acid) 70/30 Mol %

Conditions:

Prepolymer 1/poly(acrylamide/acrylic acid)=40% by weight.

Poly(Acrylamide/Acrylic Acid) concentration=22.1% by weight.

48 g of solution A, 2.81 g of sodium sulfate, 15 g of ammonium sulfate, 18.6 g of distilled water and 0.35 g of sodium hydroxide (aqueous solution at 50% by weight) were placed in a 250 ml round-bottomed flask, at ambient temperature (20° C.). The mixture was degassed by sparging with nitrogen with stirring for 30 minutes. After having added 0.068 g of VA044 (2,2'-azobis[2-(2-imidazolin-2-yl)propane]dihydrochloride), the round-bottomed flask was placed in a thermostated oil bath at 38° C., still with stirring. The introduction of a solution containing 41.82 g of acrylamide (aqueous solution at 50% by weight) and 9.09 g of acrylic acid is jointly begun, at a flow rate of 0.1697 ml/min. After reaction for 4 hours, a further 0.068 g of VA044 was added. The polymerization reaction was then left to proceed, still with stirring, at 38° C. for an additional 3 hours and 30 minutes.

At the end of the reaction, a homogeneous dispersion is obtained despite a high polymer dry extract (22.1%).

The invention claimed is:

1. A process for preparing an aqueous dispersion of water-soluble polymer, which comprises a step (E) of radical polymerization to synthesize the water-soluble polymer, wherein the following are brought into contact in an aqueous medium (M) in which the synthesized water-soluble polymer is not soluble:
   at least one ethylenically unsaturated monomer soluble in the aqueous medium (M);
   at least one source of free radicals; and
   a reactive stabilizer which comprises:
      a polymer chain (PC) which is soluble in the medium (M),
      a group (G) providing the radical polymerization of step (E) with a living and controlled nature,
   wherein the step (E) of radical polymerization comprises polymerizing the at least one ethylenically unsaturated monomer in the presence of polymer chain (PC) to form the synthesized water-soluble polymer,
   wherein the synthesized water-soluble polymer comprises the polymer chain (PC) and the polymerized at least one ethylenically unsaturated monomer;
   and wherein the medium (M) of said step (E) comprises a mixture of sodium sulfate and ammonium sulfate, with or without a solvent.

2. The process as claimed in claim 1, wherein the group (G) is a group carrying a thiocarbonylthio —S(C=S)— group.

3. The process as claimed in claim 1, wherein said step (E) is carried out with the presence of additional nonreactive stabilizing agents.

4. The process as claimed in claim 1, wherein said step (E) is not carried out in the presence of additional nonreactive stabilizing agents.

5. The process as claimed in claim 1, wherein the group (G) present on the reactive stabilizer typically corresponds to the formula —S(C=S)—Z
   where Z represents:
      a hydrogen atom,
      a chlorine atom,
      an optionally substituted alkyl or optionally substituted aryl radical,
      an optionally substituted heterocycle,
      an optionally substituted alkylthio radical,
      an optionally substituted arylthio radical,
      an optionally substituted alkoxy radical,
      an optionally substituted aryloxy radical,
      an optionally substituted amino radical,
      an optionally substituted hydrazine radical, an optionally substituted alkoxycarbonyl radical,
an optionally substituted aryloxycarbonyl radical,
an optionally substituted carboxyl, acyloxy radical,
an optionally substituted aroyloxy radical,
an optionally substituted carbamoyl radical,
a cyano radical,
a dialkyl- or diaryl-phosphonato radical,
a dialkyl-phosphinato or diaryl-phosphinato radical, or
a polymer chain.

6. The process as claimed in claim 1, wherein the group (G) is a xanthate or a dithiocarbamate.

7. The process as claimed in claim 1, wherein the monomers used in said step (E) are monomers which are soluble in the medium (M) and which are selected from the group consisting of:
 ethylenically unsaturated monocarboxylic and dicarboxylic acids,
 unsaturated carboxylic acid amides,
 vinylamine amides,
 α,β monoethylenically unsaturated amino esters,
 vinylpyridines,
 vinylamine,
 vinylimidazolines,
 monomers which are precursors of amine functions, which generate primary amine functions by simple acid or basic hydrolysis,
 ammoniumacryloyl or acryloyloxy monomers,
 trimethylammoniumpropylmethacrylate salts,
 trimethylammoniumethylacrylamide or -methacrylamide chloride or bromide,
 trimethylammoniumbutylacrylamide or -methacrylamide methylsulfate,
 trimethylammoniumpropylmethacrylamide methylsulfate (MAPTA MeS),
 (3-methacrylamidopropyl)trimethylammonium chloride (MAPTAC),
 (3-acrylamidopropyl)trimethylammonium chloride or methylsulfate (APTAC or APTA MeS),
 methacryloyloxyethyltrimethylammonium chloride or methylsulfate,
 acryloyloxyethyltrimethylammonium (ADAMQUAT) salts,
 methyldiethylammoniumethyl acrylate methylsulfate (ADAEQUAT MeS),
 benzyldimethylammoniumethyle acrylate chloride or methylsulfate (ADAMQUAT BZ 80),
 1-ethyl 2-vinylpyridinium bromide, chloride or methylsulfate, 1-ethyl 4-vinylpyridinium bromide, chloride or methylsulfate,
 N,N-dialkyldiallylamine monomers,
 dimethylaminopropylmethacrylamide,N-(3-chloro-2-hydroxypropyl)trimethylammonium chloride (DIQUAT chloride),
 dimethylaminopropylmethacrylamide,N-(3-methyl sulfate-2-hydroxypropyl)trimethylammonium methylsulfate (DIQUAT methylsulfate),
 monomer of formula I

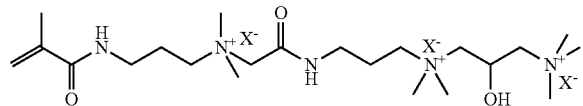

(I)

where $X^-$ is an anion, and
mixtures of two or more of these monomers.

8. The process as claimed in claim 1, wherein water-soluble crosslinking monomers are added to the aqueous medium with the water-soluble monomers or after the introduction of the water-soluble monomers.

9. The process as claimed in claim 7, wherein
 said ethylenically unsaturated monocarboxylic and dicarboxylic acids is acrylic acid, methacrylic acid, itaconic acid, maleic acid or fumaric acid,
 said unsaturated carboxylic acid amides is acrylamide, methacrylamide, N-methylolacrylamide or -methacrylamide, N-alkylacrylamides, N,N-dimethylaminomethylacrylamide or -methacrylamide, 2-(N,N-dimethylamino)ethylacrylamide or -methacrylamide, 3-(N,N-dimethylamino)propylacrylamide or -methacrylamide, or 4-(N,N-dimethylamino)butylacrylamide or -methacrylamide,
 said vinylamine amides is vinylformamide, vinylacetamide, N-vinylpyrrolidone and N-vinylcaprolactam,
 said α,β monoethylenically unsaturated amino esters is 2-(dimethylamino)ethyl acrylate (ADAM), 2-(dimethylamino)ethyl methacrylate (DMAM or MADAM), 3-(dimethylamino)propyl methacrylate, 2-(tert-butylamino)ethyl methacrylate, 2-(dipentylamino)ethyl methacrylate, or 2-(diethylamino)ethyl methacrylate,
 said monomers which are precursors of amine functions is N-vinylformamide or N-vinylacetamide,
 said trimethylammoniumpropylmethacrylate salts is chloride salt,
 said acryloyloxyethyltrimethylammonium (ADAMQUAT) salts is acryloyloxyethyltrimethylammonium chloride salt or acryloyloxyethyltrimethylammonium methylsulfate (ADAMQUAT Cl or ADAMQUAT MeS),
 said N,N-dialkyldiallylamine monomers is N,N-dimethyldiallylammonium chloride (DADMAC).

10. The process as claimed in claim 7, wherein the polymer chain (PC) is a homo- or co-polymer, respectively, resulting from homopolymerization or copolymerization of monomers selected from the group consisting of:
 ethylenically unsaturated monocarboxylic and dicarboxylic acids selected from acrylic acid, methacrylic acid, itaconic acid, maleic acid or fumaric acid,
 unsaturated carboxylic acid amides,
 vinylamine amides selected from vinylformamide, vinylacetamide, N-vinylpyrrolidone and N-vinylcaprolactam,
 α,β monoethylenically unsaturated amino esters selected from 2-(dimethylamino)ethyl acrylate (ADAM), 2-(dimethylamino)ethyl methacrylate (DMAM or MADAM), 3-(dimethylamino)propyl methacrylate, 2-(tert-butylamino)ethyl methacrylate, 2-(dipentylamino)ethyl methacrylate, or 2-(diethylamino)ethyl methacrylate, vinylpyridines,
 vinylamine,
 vinylimidazolines,
 monomers which are precursors of amine functions selected from N-vinylformamide or N-vinylacetamide, which generate primary amine functions by simple acid or basic hydrolysis,
 ammoniumacryloyl or acryloyloxy monomers,
 trimethylammoniumpropylmethacrylate salts, selected from the chloride salt,
 trimethylammoniummethylacrylamide or -methacrylamide chloride or bromide,
 trimethylammoniumbutylacrylamide or -methacrylamide methylsulfate, trimethylammoniumpropylmethacrylamide methylsulfate (MAPTA MeS),
(3-methacrylamidopropyl)trimethylammonium chloride (MAPTAC),
(3-acrylamidopropyl)trimethylammonium chloride or methylsulfate (APTAC or APTA MeS),
methacryloyloxyethyltrimethylammonium chloride or methylsulfate,
acryloyloxyethyltrimethylammonium (ADAMQUAT) salts, selected from acryloyloxyethyltrimethylammonium chloride or acryloyloxyethyltrimethylammonium methylsulfate (ADAMQUAT Cl or ADAMQUAT MeS),
methyldiethylammoniumethyl acrylate methylsulfate (ADAEQUAT MeS),
benzyldimethylammoniumethyle acrylate chloride or methylsulfate (ADAMQUAT BZ 80),
1-ethyl 2-vinylpyridinium bromide, chloride or methylsulfate or 1-ethyl 4-vinylpyridinium bromide, chloride or methylsulfate,
N,N-dialkyldiallylamine monomers,
dimethylaminopropylmethacrylamide, N-(3-chloro-2-hydroxypropyl)trimethylammonium chloride (DIQUAT chloride),
dimethylaminopropylmethacrylamide, N-(3-methylsulfate-2-hydroxypropyl)-trimethylammonium methylsulfate (DIQUAT methylsulfate),
monomer of formula I

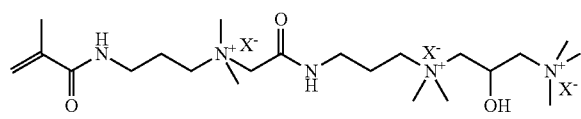
(I)

where $X^-$ is an anion, monomers carrying at least one vinyl phosphonate function, selected from vinylphosphonic acid, vinylphosphonic acid dimethyl ester, vinylphosphonic acid bis (2-chloroethyl) ester, vinylidenediphosphonic acid, vinylidenediphosphonic acid tetraisopropyl ester or alpha-styrenephosphonic acid, or mixtures thereof; and mixtures of two or more of these monomers;

wherein the polymer chain (PC) is covalently bonded to an end of a chain of the polymerized said ethylenically unsaturated monomer which forms during step (E), wherein the polymer chain (PC) remains soluble in the medium (M) while the polymerized said ethylenically unsaturated monomer which forms during step (E) is insoluble in aqueous medium (M).

11. The process as claimed in claim 1, wherein the medium (M) of step (E) further comprises at least one water-soluble solvent selected from polyol.

12. The process as claimed in claim 10, wherein the unsaturated carboxylic acid amides are selected from the group consisting of acrylamide, methacrylamide, N-methylolacrylamide and -methacrylamide, N-alkylacrylamides, N,N-dimethylaminomethylacrylamide and -methacrylamide, 2-(N,N-dimethylamino)ethylacrylamide and -methacrylamide, 3-(N,N-dimethylamino)propylacrylamide and -methacrylamide, and 4-(N,N-dimethylamino)butylacrylamide and -methacrylamide.

13. The process as claimed in claim 10, wherein the N,N-dialkyldiallylamine monomer is N,N-dimethyldiallylammonium chloride (DADMAC).

14. The process as claimed in claim 1, wherein the synthesized water-soluble polymer has a molecular weight from 5000 to 10 000 000 g/mol.

* * * * *